US00RE34028E

United States Patent [19]

Manning

[11] E Patent Number: Re. 34,028

[45] Reissued Date of Patent: Aug. 11, 1992

[54] ALUMINA-ZIRCONIA CERAMIC

[75] Inventor: William R. Manning, Richmond, Mich.

[73] Assignee: Champion Spark Plug Company, Toledo, Ohio

[21] Appl. No.: 583,663

[22] Filed: Sep. 17, 1990

Related U.S. Patent Documents

Reissue of:

[64] Patent No.: 4,879,260
Issued: Nov. 7, 1989
Appl. No.: 204,597
Filed: Jun. 8, 1988

U.S. Applications:

[63] Continuation-in-part of Ser. No. 893,609, Aug. 6, 1986, Pat. No. 4,751,207.

[51] Int. Cl.[5] ..... C03C 14/00; C04B 35/10; C04B 35/48

[52] U.S. Cl. ..... 501/32; 501/104; 501/105; 501/128; 501/153

[58] Field of Search ..... 501/32, 104, 125, 128, 501/153

[56] References Cited

U.S. PATENT DOCUMENTS

| | | | |
|---|---|---|---|
| 3,167,438 | 1/1965 | Bristow | 501/153 |
| 3,360,203 | 12/1967 | Smoke et al. | 241/15 |
| 3,615,763 | 10/1971 | Flock | 501/128 |
| 3,761,295 | 9/1973 | Hulse et al. | 501/105 |
| 3,930,874 | 1/1976 | Guile et al. | 501/104 |
| 4,155,124 | 5/1979 | Kawahara et al. | 501/152 |
| 4,218,253 | 8/1980 | Dworak et al. | 501/87 |
| 4,221,650 | 9/1980 | Friese et al. | 204/429 |
| 4,279,654 | 7/1981 | Yajima et al. | 501/97 |
| 4,313,900 | 2/1982 | Gonzales et al. | 264/61 |
| 4,316,964 | 2/1982 | Lange | 501/105 |
| 4,331,773 | 5/1982 | Hongo et al. | 501/128 |
| 4,419,311 | 12/1983 | Claussen et al. | 264/60 |
| 4,421,861 | 12/1983 | Claussen | 501/103 |
| 4,552,852 | 11/1985 | Manning | 501/105 |
| 4,751,207 | 6/1988 | Manning | 501/104 |
| 4,879,260 | 11/1989 | Manning | 501/32 |

FOREIGN PATENT DOCUMENTS

| | | |
|---|---|---|
| 2447787 | 4/1976 | Fed. Rep. of Germany . |
| 53-126008 | 11/1978 | Japan . |

OTHER PUBLICATIONS

S. R. Witek & E. P. Butler, Journal of Materials Science Letters, 4, No. 11 (Nov., 1985) pp. 1412–1414.

S. R. Witek & E. P. Butler, Journal of the American Ceramic Society 69(7) (1986) pp. 523–529.

Chemical Abstract, vol. 90, No. 16, Apr. 1979, (90:126363X).

J. Am. Ceram. Soc., vol. 59, pp. 49–51, 1976.

J. Am. Ceram. Soc., vol. 61, pp. 85–86, 1978.

Commun. of the Am. Ceram. Soc., vol. 65, pp. C-20-6–C-207, 1982.

*Primary Examiner*—Mark L. Bell
*Attorney, Agent, or Firm*—John C. Purdue

[57] ABSTRACT

A ceramic consisting essentially of from 1 to 15 percent of glass and 99 to 85 percent of a mixture of particulate $Al_2O_3$ and particulate $ZrO_2$ is disclosed. $ZrO_2$ is present in a sufficient amount, usually from ¼ to 6 percent based on the weight of the $ZrO_2$ and $Al_2O_3$, to strengthen the ceramic significantly, by comparison with an otherwise identical ceramic where the particulate $ZrO_2$ is replaced either by the glass or by particulate $Al_2O_3$. The glass constitutes a vitreous phase bonding the particulates into a dense, gas impervious structure, and can be a calcium magnesium silicate glass containing from 45 to 80 percent of $SiO_2$, from 8 to 55 percent of CaO and MgO, and not more than 15 percent of $Al_2O_3$.

4 Claims, No Drawings

ALUMINA-ZIRCONIA CERAMIC

Matter enclosed in heavy brackets [ ] appears in the original patent but forms no part of this reissue specification; matter printed in italics indicates the additions made by reissue.

REFERENCE TO RELATED APPLICATION

This is a continuation in part of application Ser. No. 893,609, filed Aug. 6, 1986, now U.S. Pat. No. [4751,207] *4,751,207* granted June 14, 1988.

DEFINITIONS

As used herein, and in the appended claims, the terms "percent" and "parts" refer to percent and parts by weight, unless otherwise indicated; g means gram or grams; cm means centimeter or centimeters; and MPa means $10^6$ Pascals.

All temperatures herein are in degrees C., unless otherwise indicated.

BACKGROUND OF THE INVENTION

1. Field of the Invention

This invention relates to an alumina ceramic containing a small, strengthening addition of zirconia; the ceramic is one which can be produced by a method that lends itself to mass production.

2. The Prior Art

The subject of alumina-zirconia ceramics produced both by hot pressing and by sintering techniques has received a great deal of attention during recent years. A journal article, Cer. Eng. and Sci. Proc., Vol 1,7-8(B) 1980, is considered to be typical of the prior art relating to such ceramics made by hot pressing. The articles, D. Lewis III and P. F. Becher, "Thermal Shock Behavior in $Al_2O_3$-based composites", reports test data indicating that [aluminazirconia] *alumina-zirconia* composites which were studied are highly resistant to thermal shock. The data relate to alumina ceramics and to ceramics composed of alumina and up to 30 percent by volume of $ZrO_2$ produced by hot pressing at 1500-1600 and 35 MPa (about 5075 pounds per square inch). The data presented indicate the alumina-zirconia ceramics to have outstanding thermal shock properties. Another journal article, J.Am.Cer.Soc., [61] *Vol. 61,* No. 12, pp. 85, 86, and U.S. Pat. No. 4,218,253, are illustrative of the prior art relating to the production of such ceramics by sintering. The patent discloses (Example 1) the production of an [aluminazirconia] *alumina-zirconia*ceramic from aluminum oxide powder (average particle size 5 microns) and monoclinic zirconium oxide powder (average particle size 1 micron). The process involves wet mixing the two powders, drying and granulating the mixture, isostatically pressing a shape from the granules, and sintering the shape at 1600 for one hour. The journal article discloses a similar process, including sintering at 1500 and 1600, but is silent as to particle size, disclosing only that "composites with a very fine and homogeneous dispersion" were achieved "by a wet-chemical method, starting from a zirconium sulfate-aluminum sulfate solution." It will be appreciated that hot pressing alumina-zirconia ceramics at 1500-1600 and 35 MPa is a costly procedure, that even sintering at 1600 is costly, and that alumina produced by a wet chemical method from a zirconium sulfate-aluminum sulfate solution is a costly starting material. Accordingly, as might be expected, the ceramics produced by the method of the subject references, and all other alumina-zirconia ceramics that have been suggested by the known prior art, are costly and have found only limited commercial use, for example as tool bits.

Japanese patent application No. 53-126008, Nov. 2, 1978, discloses the production of what has been translated as an "aluminum ceramic" having improved thermal shock resistance by pressing discs from ceramic batches and firing to 1065°. Batches containing 94 to 96 parts by weight of $Al_2O_3$, 1 to 2 parts by weight of CaO, 1 part by weight of MgO, 2 to 3 parts by weight of $SiO_2$, up to 2 parts by weight of $Cr_2O_3$ and up to 10 parts by weight of $ZrO_2$ are disclosed.

The present inventor discovered a ceramic composed of a mixture of particulate $Al_2O_3$, particulate $ZrO_2$ and glass bonding the $Al_2O_3$ and the $ZrO_2$ into a dense, gas impervious structure, and also found that all or any part of the particulate [$ZrO_2$in] *$ZrO_2$ in* such ceramics can be replaced by particulate $HfO_2$ or by a solid solution of $HfO_2$ and $ZrO_2$, in particulate form, as well as that $Y_2O_3$ can advantageously be present to stabilize at least a part of the $ZrO_2$, the $HfO_2$ or the $ZrO_2$-$HfO_2$ solid solution in a cubic crystalline structure. The glass constitutes from 1 to 15 percent of such ceramics, while particulate $Al_2O_3$ constitutes from 75 to 85 percent, based upon the weight of the $ZrO_2$, $HfO_2$, $Y_2O_3$ and $Al_2O_3$. "Manning", U.S. Pat. No. 4,552,852, is directed to this discovery.

SUMMARY OF THE INVENTION

The instant invention is based upon the discovery of a ceramic which consists essentially of from 1 to 15 percent of glass and from 99 to 85 percent of a mixture of particulate $Al_2O_3$ and particulate $ZrO_2$ in which particulate $ZrO_2$ is present in a sufficient amount, usually from ¼ to 6 percent based on the weight of the $ZrO_2$ and $Al_2O_3$, to strengthen the ceramic significantly, by comparison with an otherwise identical ceramic where the particulate $ZrO_2$ is replaced either by the glass or by particulate $Al_2O_3$. The particulates should have an ultimate particle size finer than 15 microns. The glass constitutes a vitreous phase bonding the particulates into a dense, gas impervious structure and, preferably, is a calcium magnesium silicate glass containing from 45 to 80 percent of $SiO_2$, from 8 to 55 percent of CaO and MgO, and not more than 15 percent of $Al_2O_3$. Preferably, the glass constitutes from 3 to 12 percent of the ceramic, most desirably from 5 to 12 percent. Available data indicate that a large increase in strength is achieved when [larger] *a small* addition of $ZrO_2$, e.g., ¼ percent based upon the weight of $Al_2O_3$ and $ZrO_2$ in the ceramic, is made, and that little if any additional increase in strength is achieved when [A small] *larger additions, e.g., ½ percent on the indicated basis, are made. Since $ZrO_2$* is an expensive constituent of ceramics of the type in question, it is desirable to minimize the quantity used. Accordingly, $ZrO_2$ preferably constitutes from ¼ to 4 percent, most desirably from ½ to 1½ percent, based upon the weight of the $Al_2O_3$ and $ZrO_2$ therein, in a ceramic according to the instant invention. In fact, the greatest benefit from the expensive batch ingredient is achieved when $ZrO_2$, on the indicated basis, ranges from ½ to less than 1 percent.

As is indicated above, Manning discloses that particulate $HfO_2$ and solid solutions of $HfO_2$ and $ZrO_2$ can be substituted for $ZrO_2$ in ceramics of the type in question, and that $Y_2O_3$ can also be used, the purpose of the $Y_2O_3$ being to stabilize the $ZrO_2$ or the like in a cubic crystalline structure. The same is probably true in ceramics according to the instant invention, but there is ordinarily no reason for such a ceramic to contain more than the amount of $HfO_2$ that is introduced thereinto by the 1 to 3 percent thereof that is present as an impurity in $ZrO_2$ as it occurs in nature. Accordingly, a ceramic according to the invention consists essentially of particulate $Al_2O_3$, particulate $ZrO_2$ and glass, but, in accordance with recognized meaning of the recitation, may contain $HfO_2$, $Y_2O_3$ or other incidental ingredients so long as they do not interfere with the strengthening that is achieved because of the presence of $ZrO_2$.

DESCRIPTION OF THE PREFERRED EMBODIMENTS

The following examples are presented solely for the purpose of further illustrating and disclosing the invention. They are to be construed as illustrative, and not as limiting. Example 2 constitutes the best mode presently contemplated by the invention.

EXAMPLE 1

A ceramic batch composed of 0.84 part of $ZrO_2$, 82.79 parts of $Al_2O_3$, 16.07 parts of clays and other fluxes and 0.30 part sodium lignosulfonate was wet milled for 8 hours, 70 percent solids in water, in a 17-liter mill jar. The resulting batch was spray dried. The spray dried batch was then pressed isostatically at about 5500 psi. (about 38 MPa) in a cylindrical mold; the pressed shape was rotated and ground by contact with a rotating grinding wheel to a diameter of about 3.8 cm.; and the body was placed in a setter and fired in a gas fired tunnel kiln (slightly reducing atmosphere): about seventeen hours from ambient temperature of about 22 to 1545, and about 1 1/5 hours from 1545 to 1550, followed by cooling. The fired insulator which resulted had a diameter of about 2.5 cm. The mean Charpy Impact Strength of machined bars cut from insulators produced as described in this Example was $1.68\times10^{-3}$ foot pounds.

The $ZrO_2$ used as described above in Example 1 is commercially available from TAM Ceramics, Inc. under the trade designation "Zirox 360". It consists of $ZrO_2$, 1 to 3 percent of $HfO_2$, assay, $ZrO_2$ at least 98.5 percent, and incidental impurities. A sample from the shipment from which $ZrO_2$ was used as described herein was found to have a median particle diameter of 9.71 microns and a specific surface area of 0.97 $m^2/cm^3$.

The $Al_2O_3$ used as described above in Example 1 is commercially available from Aluminum Company of America under the designation A-10 alumina. Substantially all of the material is minus 10 microns in ultimate particle size, the median ultimate particle size being 8 microns; the material is agglomerated, however, so that it has the following size characteristics relative to screens of the U.S. Sieve Series:

100 mesh 4–15 percent retained
200 mesh 50–75 percent retained
325 mesh 88–98 percent retained and 2–12 percent through.

The material consists of $Al_2O_3$, assay 99.5 percent, and incidental impurities.

The sodium lignosulfonate used as described above in Example 1 is a water soluble dispersing agent which is commercially available from American Can Company under the designation "MARASPERSE".

The clays and other fluxes used as described above in Example 1 contain $SiO_2$, MgO, CaO and $Al_2O_3$ in such proportions that the fired insulator contained 89.44 percent of $Al_2O_3$, 0.86 percent of $ZrO_2$, 7.02 percent of $SiO_2$, 1.56 percent of MgO, 0.71 percent of CaO and 0.41 percent of incidental impurities. A minor amount of the $Al_2O_3$ was dissolved in a glass which also contained the $SiO_2$, the MgO and the CaO. The glass constituted about 10 percent of the fired insulator. The precise amount of $Al_2O_3$ dissolved in the glass was not determined but, on the basis of available phase data, it was estimated that $Al_2O_3$ constituted less than 5 percent of the glass.

EXAMPLES 2 and 3

The procedure of Example 1 was repeated to produce insulators from different ceramic batch compositions. The compositions of the ceramic batches in parts and the mean Charpy Impact Strengths are given in the following table:

| | Control | Example 2 | Example 3 |
|---|---|---|---|
| $ZrO_2$ | 0.00 | 0.42 | 1.26 |
| $Al_2O_3$ | 83.63 | 83.21 | 82.37 |
| Clays and other fluxes | 16.07 | 16.07 | 16.07 |
| Sodium lignosulfonate | 0.30 | 0.30 | 0.30 |
| Charpy Impact Strength, footpounds, $\times 10^3$ | 1.07 | 1.82 | 1.82 |

EXAMPLES 4–7

Insulators were also produced from other ceramic batch compositions using substantially the procedure of Example 1, the only differences being that the batches were milled in 7-liter mill jars, 70 percent solids in water, for 10 hours; and 0.39 part ammonium polyelectrolyte dispersant was used in place of the sodium lignosulfonate. The compositions of the ceramic batches in parts and the mean Charpy Impact Strengths are given in the following table:

| | Control | Example 4 | Example 5 | Example 6 | Example 7 |
|---|---|---|---|---|---|
| $ZrO_2$ | 0.00 | 0.84 | 1.67 | 2.50 | 4.18 |
| $Al_2O_3$ | 83.55 | 82.71 | 81.88 | 81.05 | 79.37 |
| Clays and other fluxes | 16.06 | 16.06 | 16.06 | 16.06 | 16.06 |
| Ammonium poly-electrolyte dispersant | 0.39 | 0.39 | 0.39 | 0.39 | 0.39 |
| Charpy Impact Strength, footpounds, $\times 10^3$ | 1.824 | 2.448 | 2.309 | 2.040 | 2.063 |

EXAMPLES 8–12

Insulators were also produced from other ceramic batch compositions using substantially the procedure of Example 1, the only differences being that the batches were milled in 7-liter mill jars, 72 percent solids in water, for 9½ hours. Control insulators were produced from a batch composed of 83.24 parts of $Al_2O_3$, 15.98 parts of clays and other fluxes, 0.25 part of sodium lignosulfonate and 0.53 part of ammonium polyelectrolyte dispersant, while test insulators were produced from batches composed of 82.75 parts of $Al_2O_3$, 15.98 parts of clays and other fluxes, 0.25 part of sodium lignosulfonate, 0.53 part of ammonium polyelectrolyte dispersant and 0.49 part of various grades of zirconia. The grades of zirconia tested, the Charpy Impact Strength in footpounds [] $x \times 10^3$ of machined bars cut from insulators made from each of the batches, and the fired bulk density in grams per cubic centimeter of the insulators, and the cantilever breaking load in pounds of the terminal ends of spark plug insulators made from each of the batches are set forth in the following table:

| | Control | Example 8 | Example 9 | Example 10 | Example 11 | Example 12 |
|---|---|---|---|---|---|---|
| Zirconia Grade | — | "Zirox 360" | "SC-101" | "Zirox Tr" | "HSY-3" | "DK-1" |
| Charpy Impact Strength | 1.140 | 1.940 | 1.750 | 2.010 | 1.760 | 1.690 |
| Fired Bulk Density | 3.524 | 3.569 | 3.571 | 3.571 | 3.575 | 3.571 |
| Cantilever Breaking Load | 465 | 534 | 505 | 503 | 526 | 543 |

Grade "SC-101" of zirconia is commercially available From Magnesium Elektron. It was found to have a median particle diameter of 4.14 microns and a specific surface area of 1.47 $m^2/cm^3$. It consists of $ZrO_2$, 1-3 percent of $HfO_2$, assay, $ZrO_2$ and $HfO_2$ at least 98.5 percent, and incidental impurities.

Grade "Zirox Tr" of zirconia is commercially available from TAM Ceramics, Inc. It was found to have a median particle diameter of 3.43 microns and a specific surface area of 1.49 $m^2/cm^3$. It consists of $ZrO_2$, 1-3 percent of $HfO_2$, assay $ZrO_2$ and $HfO_2$ at least 98.5 percent, and incidental impurities.

Grade "HSY-3" of zirconia is commercially available from Daiichi Kigenso. It was found to have a median particle diameter of 3.37 microns and a specific surface area of 1.67 $m^2/cm^3$. It consists of $ZrO_2$, 1-3 percent of $HfO_2$, assay, $ZrO_2$ and $HfO_2$ at least 93.1 percent, 5.4 percent of $Y_2O_3$, and incidental impurities.

Grade "DK-1" of zirconia is commercially available from Daiichi Kigenso. It was found to have a median particle diameter of 3.37 microns and a specific surface area of 1.76 $m^2/cm^3$. It consists of $ZrO_2$, 1-3 percent of $HfO_2$, assay $ZrO_2$ and $HfO_2$ at least 98.5 percent, and incidental impurities.

It will be observed from a comparison of the foregoing data concerning Examples 1-3 and the associated control with the data concerning Examples 4-7 and the associated control and that for Examples 8-12 and the associated control that the different milling procedures used caused substantial changes in the magnitudes of the Charpy Impact Strengths. The percentage increases, however, relative to the relevant controls, follow the same patterns, indicating that the strengthening caused by the added $ZrO_2$ is independent of the milling procedures. The percentage increases are reported in the following table:

| Percent of Added $ZrO_2$ | 0.5 | 1.0 | 1.5 | 2.0 | 3.0 | 5.0 |
|---|---|---|---|---|---|---|
| Example 2 | 70 | | | | | |
| Example 8 | 70 | | | | | |
| Example 9 | 54 | | | | | |
| Example 10 | 76 | | | | | |
| Example 11 | 54 | | | | | |
| Example 12 | 48 | | | | | |
| Example 1 | | 57 | | | | |
| Example 4 | | 34 | | | | |

-continued

| Percent of Added $ZrO_2$ | 0.5 | 1.0 | 1.5 | 2.0 | 3.0 | 5.0 |
|---|---|---|---|---|---|---|
| Example 3 | | | 70 | | | |
| Example 5 | | | | 27 | | |
| Example 6 | | | | | 12 | |
| Example 7 | | | | | | 13 |

EXAMPLES 13-16

Insulators having a nominal 92 percent $Al_2O_3$ content, and containing varying amounts of $ZrO_2$ were also produced using substantially the procedure of Example 1, the only differences being that a different grade of $Al_2O_3$ was used and that the batch was milled in 7-liter mill jars, 72 percent solids in water, for 10½ hours. Typical batch compositions, Charpy Impact Strengths and densities are given in the following table:

| | Control | Example 13 | Example 14 | Example 15 | Example 16 |
|---|---|---|---|---|---|
| $ZrO_2$ | 0.00 | 0.25 | 0.49 | 0.73 | 0.97 |
| $Al_2O_3$ | 87.49 | 87.49 | 87.49 | 87.49 | 87.49 |
| Clays and other fluxes | 11.73 | 11.48 | 11.24 | 11.00 | 10.76 |
| Sodium lignosulfonate | 0.25 | 0.25 | 0.25 | 0.25 | 0.25 |
| Ammonium polyelectrolyte dispersant | 0.53 | 0.53 | 0.53 | 0.53 | 0.53 |
| Charpy Impact Strength, footpounds $\times 10^3$ | 1.32 | 1.70 | 1.94 | 1.96 | 1.84 |
| Fired Bulk Density, $g/cm^3$ | 3.616 | 3.634 | 3.642 | 3.644 | 3.651 |

The $Al_2O_3$ used in the batches of the previous table was obtained from Aluminum Company of America under the grade designation A-121. Substantially all of the material is minus 5 microns in ultimate particle size; the material is agglomerated, however, so that it has the following size characteristics relative to screens of the U.S. Sieve Series:

100 mesh 4-15 percent retained 200 mesh 50-75 percent retained 325 mesh 88-98 percent retained and 2-12 percent through The material consists of $Al_2O_3$, assay 99.5 percent, and incidental impurities.

It will be noted from the data in the foregoing table that both the fired bulk densities and the strengths of the specimens produced were increased by the additions of $ZrO_2$ that were made in the procedures of Examples 13-16. This is generally true of ceramics according to the instant invention. Although the invention is in no way to be limited by the following theory, it is believed that the $ZrO_2$ additions cause a decrease of the size of the pores of the ceramic, and that both the increased density and the strengthening are consequences of this decrease.

It will be apparent that various changes and modifications can be made from the specific details of the invention as described above without departing from the spirit and scope thereof as defined in the appended claims.

What I claim is:

1. A ceramic consisting essentially of from [1] 5 to 15 percent and [99] 95 to 85 percent of a mixture of particulate $Al_2O_3$ and particulate $ZrO_2$, the particulates all being finer than 15 microns in ultimate particle size, $ZrO_2$ constituting from ¼ to 4 percent based upon the weight of $ZrO_2$ and $Al_2O_3$ in the ceramic, and said glass constituting a vitreous phase bonding the particulates into a dense, gas impervious structure, and being a calcium magnesium silicate glass containing from 45 to 80 percent of $SiO_2$, from 8 to 55 percent of CaO and MgO, and not more than 15 percent of $Al_2O_3$.

[2. A ceramic as claimed in claim 1 wherein the glass constitutes from 3 to 12 percent thereof.]

3. A ceramic as claimed in claim 1 wherein the glass constitutes from 5 to 12 percent thereof.

4. A ceramic as claimed in claim 1 wherein particulate $Al_2O_3$ constitutes more than 99 and not more than 99½ percent, based upon the weight of the $ZrO_2$ and $Al_2O_3$ in the ceramic.

[5. A ceramic as claimed in claim 2 wherein particulate $Al_2O_3$ constitutes more than 99 and not more than 99½ percent, based upon the weight of the $ZrO_2$ and $Al_2O_3$ in the ceramic.]

6. A ceramic as claimed in claim 3 wherein particulate $Al_2O_3$ constitutes more than 99 and not more than 99½ percent, based upon the weight of the $ZrO_2$ and $Al_2O_3$ in the ceramic.

* * * * *